United States Patent [19]

Blond et al.

[11] Patent Number: 4,666,024

[45] Date of Patent: May 19, 1987

[54] CLUTCH MECHANISM

[75] Inventors: Marcel Blond, Savigny Le Temple; Philippe Dufau, Eaubonne, both of France

[73] Assignee: Valeo, Paris, France

[21] Appl. No.: 689,927

[22] Filed: Jan. 9, 1985

[30] Foreign Application Priority Data

Jan. 10, 1984 [FR] France ............................ 84 00273

[51] Int. Cl.⁴ ............................................ F16D 13/71
[52] U.S. Cl. ............................. 192/70.16; 192/70.28; 192/89 B
[58] Field of Search ............... 192/48.8, 70.16, 70.11, 192/70.13, 70.27, 70.28, 70.29, 89 B, 112; 74/15.8, 15.82, 15.84, 15.88

[56] References Cited

U.S. PATENT DOCUMENTS

| | | | |
|---|---|---|---|
| 2,349,880 | 5/1944 | Orelind | 74/15.84 |
| 2,513,333 | 7/1950 | Keese et al. | 74/15.84 |
| 2,899,034 | 8/1959 | Hubert | 192/18 |
| 3,004,438 | 10/1961 | Funk et al. | 74/15.84 X |
| 3,352,166 | 11/1967 | Marquart et al. | 74/15.84 |
| 4,131,187 | 12/1978 | Smith et al. | 192/99 |
| 4,375,253 | 3/1983 | Mott | 192/89 B |

FOREIGN PATENT DOCUMENTS

| | | |
|---|---|---|
| 7621265 | 1/1977 | Fed. Rep. of Germany . |
| 2392275 | 5/1978 | France . |
| 1320488 | 6/1973 | United Kingdom . |
| 307920 | 7/1971 | U.S.S.R. . |

Primary Examiner—George H. Krizmanich
Attorney, Agent, or Firm—Charles A. Brown; Charles E. Brown

[57] ABSTRACT

A clutch mechanism is designed to couple at will a flywheel and a shaft, and is equipped with a power takeoff for permanently driving a second shaft concentric with the first shaft.

11 Claims, 8 Drawing Figures

FIG.4
FIG.5
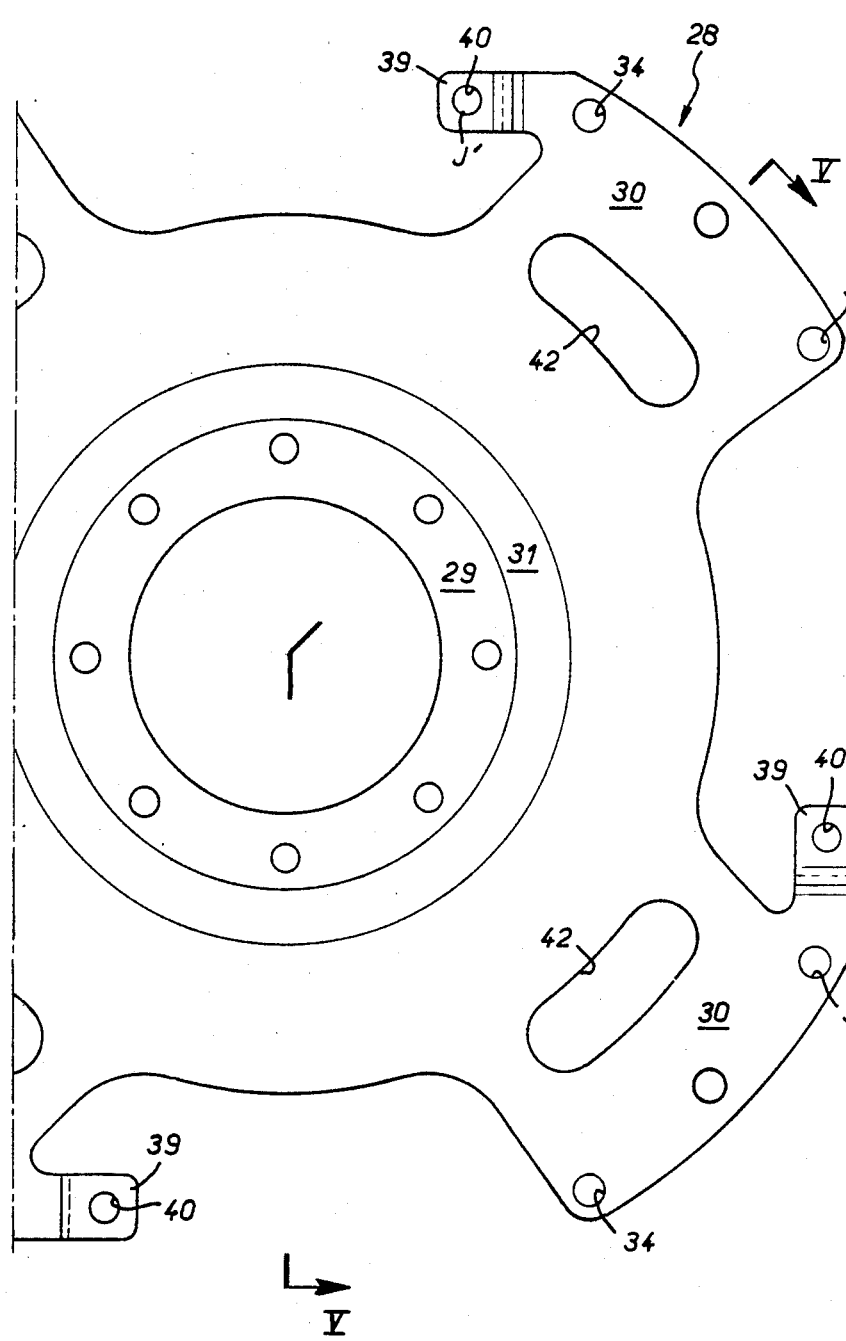
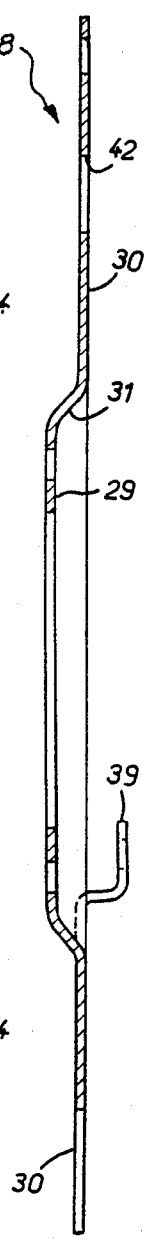

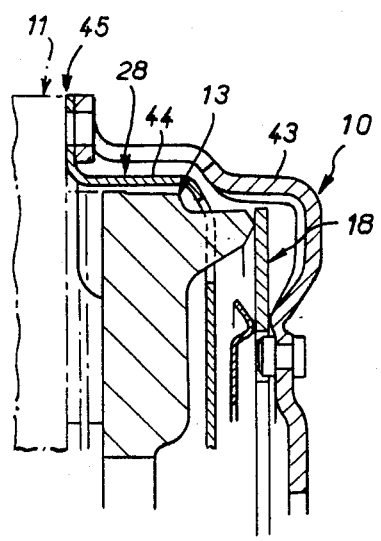
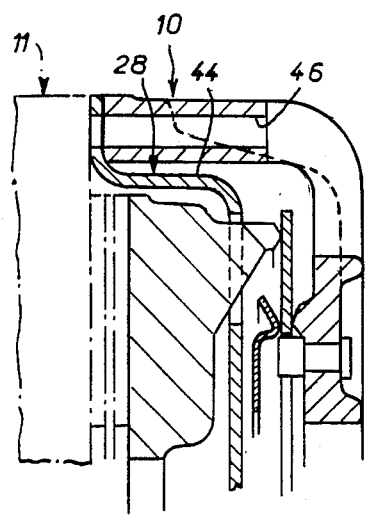
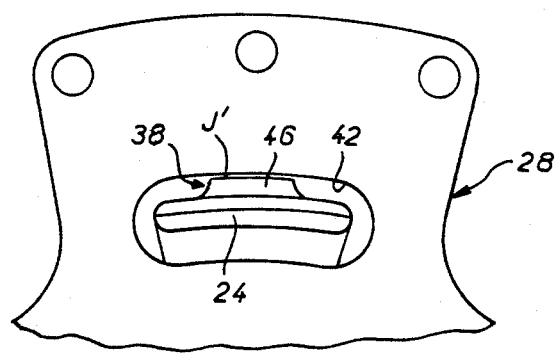

CLUTCH MECHANISM

The present invention refers to a clutch mechanism comprising a cover designed to be secured to a flywheel by means of fasteners, a pressure plate, a flexible diaphragm acting between the cover and the pressure plate for the clamping and releasing of a friction disc between the flywheel, forming a reaction plate, and the pressure plate, the friction disc having a coupling hub to a first shaft, a link plate located between the diaphragm and the pressure plate and rendering integral with the cover a second hub intended for the coupling of a second shaft concentric with the first shaft.

Such clutch mechanism is particularly useful for application to agricultural and public works equipment where it is desirable to have a power takeoff permanently attached to the cover.

The use of a link plate, generally annular in shape, which is placed axially between the diaphragm and the pressure plate, makes it possible to attach the second hub to the cover in a flexible and effective manner, but while the assembly of this link plate to the second hub is generally carried out successfully, the problem of assembling the link plate to the cover has not yet been solved satisfactorily from the point of view of sturdiness, simplicity, convenience and layout.

The object of the present invention is a clutch mechanism of the type indicated above, which meets the various practical requirements more effectively than in the past and in which the link plate between the cover and the second hub benefits from an excellent method of assembly, both simple and robust, of compact design and providing a convenient way of securing the mechanism to the flywheel.

According to the invention, a clutch mechanism of the type indicated above is specifically characterised in that the link plate is designed to be secured to the cover by means of the same fasteners used to secure the cover to the flywheel.

With this arrangement a high degree of simplification is achieved, because the same fasteners are used, not only to secure the mechanism to the flywheel, but also to secure the link plate to the cover. In particular, the construction of the cover is as simple, notwithstanding the existence of the power takeoff, as though the mechanism lacked such power takeoff.

Furthermore, the attachment is achieved under excellent conditions, since it is located at the periphery where the available space is significant and where high clamping strength can be obtained.

According to another feature, in order to secure the cover the link plate has three holes designed to locate with clearance on the fasteners, the link plate being designed to be gripped between the cover and the flywheel. Thus, as a result of the clearance referred to above, the attachment of the link plate does not hamper in any way whatsoever the attachment of the mechanism to the flywheel.

By way of an alternative, the link piece may be gripped between the cover and the fasteners, when the diaphragm is located outside the cover.

More particularly, the fasteners consist of devices which have a shank and at least one hand, the shank being inserted in the flywheel and passing with clearance through the holes in the link plate, while the head abuts the cover or the link plate.

In one form of implementation, the fasteners are advantageously provided with screws which are screwed into the flywheel and which pass with clearance both through the cover and through the link plate, while centering pins are inserted in the flywheel and pass without clearance through the cover and with clearance through the link plate. This provides the advantage of an excellent structure with accurate and convenient assembly.

When the mechanism is placed in storage, i.e. before being fitted to the flywheel, it should desirably incorporate the link plate, both for actual convenience of storage and to facilitate subsequent assembly of the mechanism to the flywheel.

For this purpose, according to another feature of the invention, facilities for presetting with clearance are provided for the link plate inside the mechanism and are intended to ensure that, before the mechanism is assembled to the flywheel, the link plate does not deviate substantially from the position which it should normally occupy in relation to the cover, and also that, at the time of attaching the mechanism to the flywheel, such attachment is not hampered.

Since these presetting facilities are essentially provided with clearance, they do not hamper in any way whatsoever the attachment of the mechanism to the flywheel.

In one form of implementation, the facilities for presetting with clearance are designed to act between the link plate and the cover and advantageously include lugs on the link plate in which holes are provided which locate with clearance on the cover studs.

By way of an alternative, the facilities for pre-setting with clearance are designed to act between the link plate and the pressure plate and preferably include holes in the link plate which locate with clearance on the projections in the pressure plate.

Various forms of implementation of the invention are described hereunder by way of example, with reference to the annexed drawings in which:

FIG. 4 is a partial elevation view of the link plate;

FIG. 5 is a corresponding cross section view of this link plate according to the broken line V—V of FIG. 4;

FIG. 6 is a partial view similar to FIG. 1 and concerns an alternative in which the cover is hollow in shape;

FIG. 7 concerns another alternative in which the cover is not made of steel plate but of cast iron.

FIG. 8 illustrates a presetting alternative for the link plate in the mechanism, in which the facilities for presetting the link plate act in conjunction, not with the cover, but with the pressure plate.

Reference will first be made to FIGS. 1 to 5 which concern, by way of a non-exhaustive example, the application of the invention to a diaphragm clutch equipped with a power takeoff and specifically intended for use on an agricultural or public works machine.

Figure 1:
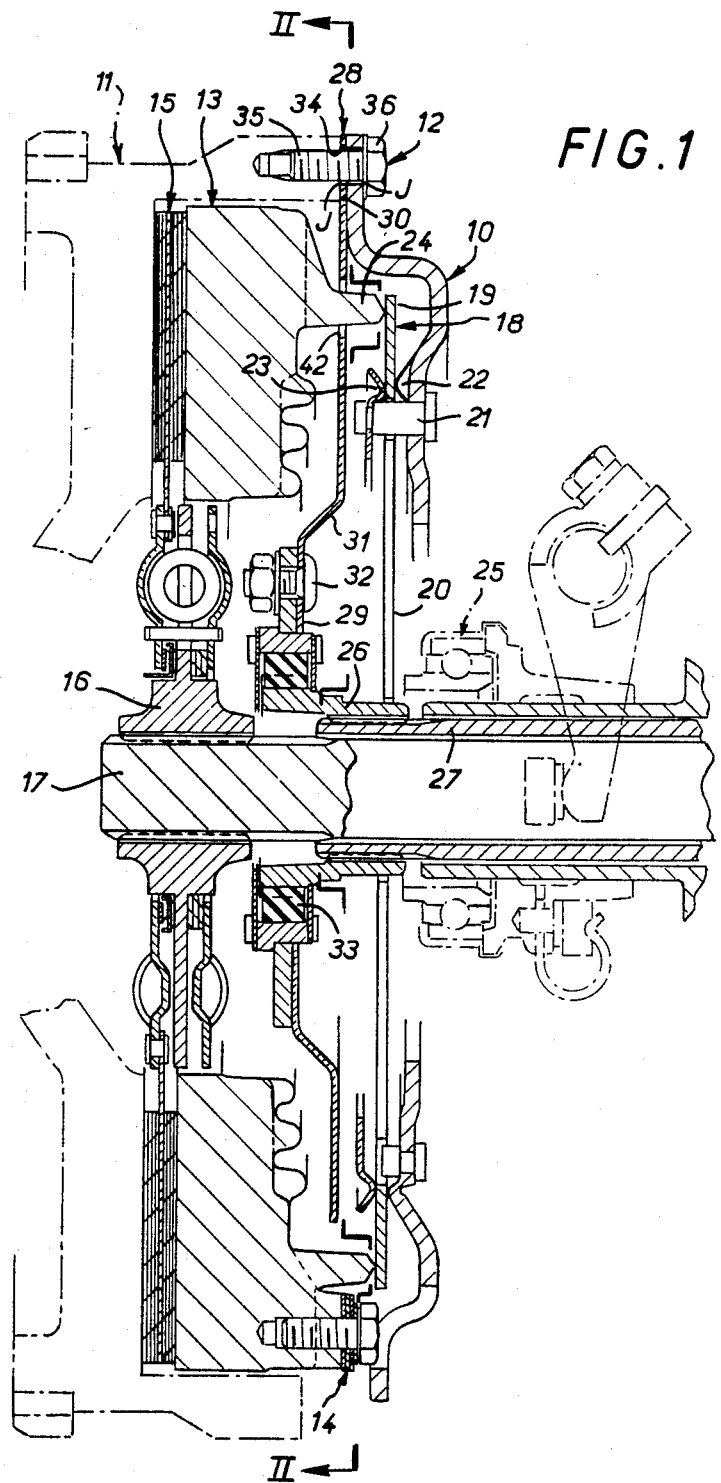
FIG. 1 is a longitudinal section view of a clutch mechanism according to the broken line I—I of FIG. 2.
Figure 2:
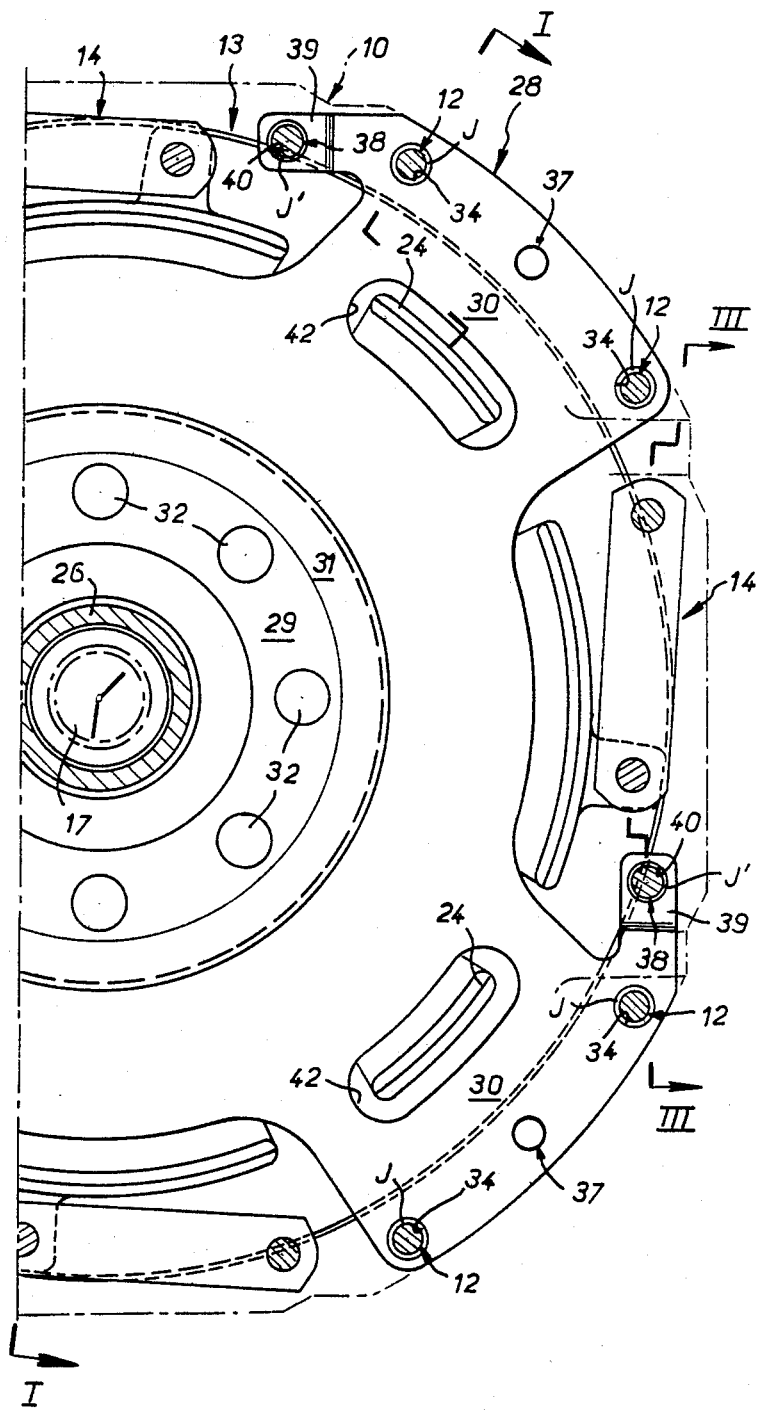
FIG. 2 is a partial elevation view of a clutch mechanism according to the arrows II—II of FIG. 1.
Figure 3:
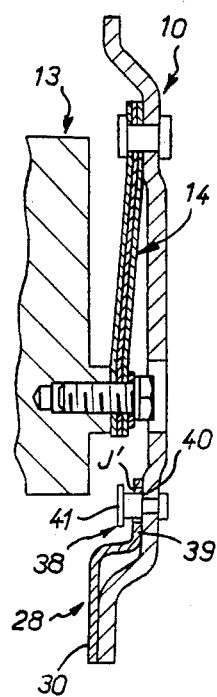
FIG. 3 shows a connecting strip between the pressure plate and the cover seen in cross section according to line III—III of FIG. 2.

The clutch mechanism comprises a cover 10 designed to be attached to a flywheel 11, for example by means of screw 12. A pressure plate 13 is assembled to cover 10 in such a manner as to be integral therewith in rotation and axially displaceable. For example, plate 13 attached to cover 10 by means of tangential coupling strips, particularly strips such as strips 14 (FIGS. 1 to 3).

A friction disc 15 comprises a hub 16 for attachment to a first shaft 17. Disc 15 is designed to be either clamped between flywheel 11, acting as a reaction plate, and pressure plate 13, for the purpose of engaging the clutch, or released in order to disengage the clutch. A flexible diaphragm seen in 18 is fitted on cover 10 and acts in conjunction with pressure plate 13 in order to manoeuvre the latter for the purpose of clamping and releasing friction disc 15.

In greater detail, diaphragm 18 is generally in the form of an annular seat the periphery 19 of which is continuous and consists of a Belleville washer, while the middle part has a series of radial slots to define declutching fingers 20.

Diaphragm 18 is assembled to cover 10 by means of a circular series of studs 21.

In the example shown in FIG. 1, diaphragm 18 is applied against cover 10 and bears on a projection of the latter in the form of a circular cord 22, while a retaining washer 23 is provided on the other side of diaphragm 18.

Diaphragm 18 cooperates with pressure plate 13 by application of Belleville washer 19 against various protrusions 24 of plate 13.

When fingers 20 are released, washer 19 effectively exerts a flexible thrust on plate 13, thus clamping disc 15. In order to disengage the clutch, a declutching control, for instance a declutching stop 25, acts on fingers 20 in an axial sense towards the left of FIG. 1, thus rocking fingers 20 and eliminating the thrust exerted by washer 19 on plate 13. This results in the release of friction disc 15 and, in the course of such release, the diaphragm comes to rest on cord 23.

The clutch is equipped with a power takeoff on cover 10, and this power takeoff does not necessitate any major departure from the design which has just been described.

The power takeoff comprises a hub 26 which is located beside hub 16 and is intended for the coupling of a second shaft 27 concentric with the first shaft 17. Hub 26 is made integral with cover 10 by means of link plate 28. This link plate is generally annular in shape and comprises more particularly a flat part 29 on the inside for attachment to hub 26, a flat part 30 on the outer periphery for attachment to cover 10 and an intermediate part 31. The flat parts 29 and 30 are axially offset relative to one another, while the intermediate part 31 is conical. However, plate 28 may be entirely flat if the layout so permits.

As shown in FIG. 1, link plate 28 is situated between pressure plate 13 and diaphragm 18. The sequence, in the axial sense, is as follows: flywheel or reaction plate 11, friction disc 15, pressure plate 13, link plate 28, diaphragm 18 and cover 10. Diaphragm 18 may likewise be situated outside cover 10, the sequence in this case being: 11, 15, 13, 10, 28, 18 or 11, 15, 13, 28, 10, 18.

In the example shown, the flat inside part 29 of link plate 28 is secured to hub 26 by screws 32, fitted with spring washer 33.

The flat part 30 on the outer periphery of link plate 28 is designed to be secured to cover 10 by means of fasteners 12, which are themselves used to secure cover 10 to flywheel 11.

This latter arrangement enables the design to be considerably simplified and ensures high clamping strength, while facilitating assembly.

More particularly, in order to secure it to cover 10, link plate 28 is provided with holes 34 (FIGS. 1 to 5) which are designed to locate with clearance J (FIG. 1) on fasteners 12, link plate 28 being designed to be gripped by its peripheral part 30 between cover 10 and flywheel 11.

Fasteners 12, which consist of screws in the example shown in FIGS. 1 to 5, are devices which have a threaded shank 35 and at least one head 36. Threaded rod 35 is screwed into flywheel 11 and passes with clearance J through hole 34 in link plate 28 and through cover 10 with clearance J1, thus facilitating assembly of the cover, while head 36 abuts cover 10. Additionally, centreing pins 37 (FIG. 2) are inserted in the flywheel and pass without clearance through cover 10 and with clearance through link plate 28. J and J1 may be of the same order.

To ensure convenient storage of the clutch mechanism and also to facilitate assembly of this mechanism on flywheel 11, presetting facilities 38 can, if necessary, be provided for link plate 18 inside the mechanism.

Presetting facilities 38 are intended to ensure that, before the mechanism is assembled to flywheel 11, link plate 28 does not deviate substantially from the position which it should normally occupy in relation to cover 10, as represented in FIG. 1, and also that, at the time of attaching the mechanism to flywheel 11, such attachment is not hampered.

In the example shown in FIGS. 1 to 5, the facilities for presetting with clearance 38 are designed to act between link plate 28 and cover 10, and include lugs 39 on link plate 28 in which holes 40 are provided which locate with clearance J' on studs 41 of cover 10.

Additionally, as shown in FIGS. 1 to 5, link plate 28 includes openings 42 to allow the passage of protrusions 24 of pressure plate 13.

With the arrangement just described, the mechanism may be easily stored while incorporating link plate 28 with hub 26, since this plate is roughly preset by the presetting facilities 38 providing clearance J'.

At the time of assembly, clearance J' makes it possible to avoid hampering the insertion of screws 12 in the flywheel for securing purposes, and it will be appreciated that clearance J provided between holes 34 of link plate 28 and the actual screws 12 prevents the securing of screws 12 from being itself hampered. J' should preferably be lower than J. It will be appreciated that the assembly of hub 26 to shaft 27 ensures a radial setting, with J and J' acting circumferentially to prevent any contact between 13 and 28.

Nevertheless, the attachment of link plate 28 to cover 10 is extremely robust since, on the one hand, it is situated at the very periphery of cover 10 and, on the other hand, link plate 28 is gripped axially in a very effective manner between cover 10 and flywheel 11 at the time that screws 12 are tightened.

In the example shown in FIGS. 1 to 5, cover 10 generally has a relatively flat shape at the periphery, but the arrangement according to the invention can also apply to any other shapes of cover, and in particular to the shape represented in FIG. 6, to which reference will now be made, in which cover 10 is provided with a rim 43 and is therefore generally hollow in shape, thus linking up with flywheel 11 which, in turn, is designed relatively flat. In this case, link plate 28 is designed with a cylindrical part 44 which runs along edge 43 of cover 11 to link up at 45 with the interface between cover 10 and flywheel 11.

In the alternative shown in FIG. 7, link plate 28 also has a cylindrical part similar to part 44, in order to allow for the shape of cover 10 which is hollow and is also of thick section, this cover 10 being made of cast iron instead of steel plate as in the previous examples. In this case, holes 46 are provided in the thick section of cover 10 to enable the fixing screws to be inserted and tightened in flywheel 11.

In another alternative (FIG. 8), facilities 38 for presetting link plate 28 relative to the mechanism are provided, not between this link plate and cover 10, but between the said link plate and pressure plate 13. In this case, protrusions 24 on the pressure plate are provided with an extra thick portion 46 which, with clearance J', acts in conjunction with openings 42 in link plate 28. Here again, the radial presetting obtained is excellent and in no way prevents ease of assembly of the mechanism to flywheel 11. In turn, clearance J provides the circumferential setting.

Of course, the invention is not limited to the forms of implementation described and shown but covers all alternatives both in the design of its various components and in its applications, within the scope of the claims. The invention applies in particular to twin-disc and other clutches.

We claim:

1. A clutch assembly comprising a cover adapted to be secured to a flywheel by means of fasteners, a pressure plate, a diaphragm spring mounted on said cover and disposed axially between said cover and said pressure plate for releasably clamping a friction disc of the type having a coupling hub adapted to be coupled to a first shaft between a flywheel and said pressure plate, a link plate located axially between said diaphragm spring and said pressure plate and fixed relative to said cover, said link plate having a coupling hub cooperable with a second shaft for connecting a second shaft for rotation with said cover, said fasteners for securing said cover to the flywheel also securing said link plate to said cover.

2. A clutch assembly according to claim 1, wherein said link plate has holes adapted to be received with clearance on said fasteners, and said link plate being adapted to be gripped against said cover.

3. A cover assembly according to claim 2, wherein said fasteners each comprises a shank and a head, said shanks being engageable with a flywheel and received with clearance in the holes in said link plate with said heads bearing against said cover.

4. A clutch assembly according to claim 3, wherein said fasteners are threaded fasteners threadably engageable with a flywheel, said fasteners also passing with clearance through said cover, and centering pin means adapted to be received in the flywheel and passing without clearance through said cover and with clearance through said link plate.

5. A clutch assembly according to claim 3, wherein presetting means permanently preposition said link plate with clearance on another part of said clutch assembly such that the position of said link plate does not deviate substantially from its normal position relative to said cover so that said fasteners can secure said cover to a flywheel unhindered.

6. A clutch assembly according to claim 5, wherein said another part of said clutch assembly is said cover.

7. A clutch assembly according to claim 6, wherein said presetting means comprise lugs on said link plate having holes and studs on said cover received with clearance in said holes in said link plate lugs.

8. A clutch assembly according to claim 7, wherein said clearance defined by said presetting means for said link plate relative to said cover is less than the clearance between said holes in said link plate and said fasteners.

9. A clutch assembly according to claim 5, wherein said another part of said clutch assembly is said pressure plate.

10. A clutch assembly according to claim 9, wherein said presetting means comprise holes in said link plate and projections on said pressure plate received with clearance in said holes.

11. A clutch assembly comprising a cover adapted to be secured to a flywheel by means of fasteners, a pressure plate, a diaphragm spring mounted on said cover and disposed axially between said cover and said pressure plate for releasably clamping a friction disc of the type having a coupling hub adapted to be coupled to a first shaft between a flywheel and said pressure plate, a link plate located axially between said diaphragm spring and said pressure plate and fixed relative to said cover, said link plate having a coupling hub cooperable with a second shaft for connecting a second shaft for rotation with said cover, said fasteners for securing said cover to the flywheel also securing said link plate to said cover, presetting means permanently prepositioning said link plate with clearance on another part of said clutch assembly such that the position of said link plate does not deviate substantially from its normal position relative to said cover so that said fasteners can secure said cover to a flywheel unhindered.

* * * * *